United States Patent [19]

Bertin et al.

[11] 4,334,303

[45] Jun. 8, 1982

[54] MONITORING SYSTEM FOR TELECOMMUNICATION LINKS EQUIPPED WITH REPEATERS-REGENERATORS

[75] Inventors: Marcel R. Bertin, Sceaux; Patrick E. Boutmy, Paris; Gilbert J. Le Fort; Jean G. Walraet, both of Lannion, all of France

[73] Assignee: Societe Anonyme de Telecommunications, Paris, France

[21] Appl. No.: 141,679

[22] Filed: Apr. 18, 1980

[30] Foreign Application Priority Data

Apr. 19, 1979 [FR] France .................................. 79 09840

[51] Int. Cl.³ ............................................. H04J 1/16
[52] U.S. Cl. ............................... 370/13; 179/175.31 R; 455/15; 455/18
[58] Field of Search .......... 455/7, 9, 11, 13, 15, 455/16, 18, 601; 179/175.31 R; 375/3, 4; 370/13

[56] References Cited

U.S. PATENT DOCUMENTS

| 2,514,367 | 7/1950 | Bond et al. | ............................. 455/15 |
| 3,458,661 | 7/1969 | Forde et al. | ................ 179/175.31 R |
| 3,987,395 | 10/1976 | Desombre et al. | ...................... 375/4 |
| 4,083,003 | 4/1976 | Haemmig | .............................. 455/18 |

*Primary Examiner*—Joseph A. Orsino, Jr.
*Attorney, Agent, or Firm*—Lowe, King, Price & Becker

[57] ABSTRACT

Monitoring system for a forward and backward link equipped with two way repeaters-regenerators comprises a monitoring station including means for transmitting through the forward link information data and a low frequency control signal and for receiving through said backward link information data and supervisory words respectively monitoring the performance of the repeaters-regenerators and identifying errors made therein. In each repeater regenerator a supervisory word is stored in a shift register and advance pulses for said shift register are obtained by frequency division of the low frequency control signal. The supervisory word is completed by a start bit and a stop bit, and modulates the low frequency control signal. The modulated start stop supervisory word is transmitted to the monitoring station through the backward link.

7 Claims, 3 Drawing Figures

MONITORING SYSTEM FOR TELECOMMUNICATION LINKS EQUIPPED WITH REPEATERS-REGENERATORS

BACKGROUND OF THE INVENTION

1. Field of the Invention

The invention generally relates to transmission links for frequency division multiplex or time division multiplex signals equipped with repeaters-regenerators and more particularly to a supervisory system of the repeaters-regenerators inserted in a link section between a monitoring station and a monitored station for monitoring performance and identify faulty units; more precisely, the function of this supervisory system is to transmit information relative to the status of the repeaters-regenerators to a control point, normally the monitoring station.

It is well known to provide the repeaters-regenerators with error monitoring circuits. The error information collected in each repeater-regenerator is obtained by sampling the state of a number of alarm trigger circuits and by counting the number of in-line code errors and coding this number. The resulting binary pattern is stored in a register in the repeater-regenerator. For example, if the in-line code is the bipolar code, the error monitoring circuit counts the number of bipolarity viols. If the in-line code is the high density bipolar code, the error monitoring circuit counts the number of sequences containing more than n zeros.

The binary pattern in the register is then pulsed out of the register at the supervisory transmission rate and used to modulate a carrier. The resulting signal may then be demodulated at the line terminal and interpreted as required.

2. Description of the Prior Art

The article "A 120 Mb/s Digital Transmission System on Coaxial Cable", by J. P. WAKELING, published in POINT-TO-POINT COMMUNICATION, Vol. 18, Nr. 1, January 1974 discloses a supervisory system for a digital link in which a plurality of audio-frequency carriers, each of which is associated with one power fed repeater-regenerator, are modulated by the binary pattern identifying the faulty units. In this supervisory system, there is a need for as many carriers as repeaters-regenerators plus an error rate signal and at least two pass-band filters in each repeater-regenerator for separating the associated carrier and the error rate monitor control carrier.

U.S. Pat. No. 3,987,395 issued Oct. 19, 1976, discloses a further system of telemonitoring for digital links equipped with one-way repeaters-regenerators. According to this patent, each repeater-regenerator is provided with an error detector and counter having an output supplying an error rate coder, in turn connected to a supervisory register. The repeater-regenerator receives a time division multiplex frame with a framing word and comprises means for retiming the clock pulse of the frame;
means for counting the successive numbers of the time-slots; and
means for entering the contents of the supervisory registory register into the time-slot having a number assigned to the repeater-regenerator.

Such a system is not adapted to monitor a link equipped with two-way repeaters-regenerators in which the supervisory information generated in a given repeater-regenerator is transmitted to the monitoring station from said given repeater-regenerator directly through the backward link. The time division multiplex frame thus loses a time-slot at each repeater-regenerator, causing the number of time-slots in the frame to decrease as the frame travels on the forward link.

Further, the control signal in the link must comprise both a low frequency signal and clock pulses defining the time division multiplex frame and the repeaters-regenerators must include clock pulse restoring means.

The object of the invention is to provide a monitoring system for telecommunication forward and backward links equipped with two-way repeaters-regenerators, wherein the system only needs a low frequency signal, frequency multiplexed with the data to be transmitted.

SUMMARY OF THE INVENTION

The monitoring system for a forward and backward link equipped with two-way repeaters-regenerators comprises a monitoring station containing means for sending through the forward link information data and a low frequency control signal and means for receiving through said backward link information data and supervisory words respectively monitoring the performance of the repeaters-regenerators and identifying errors made therein.

In each repeater regenerator a supervisory word is stored in a shift register. Advance pulses for said shift register are obtained by frequency division of the low frequency control signal. The supervisory word is completed by a start bit and a stop bit, and modulates the low frequency control signal. The modulated start stop supervisory word is sent to the monitoring station through the backward link.

BRIEF DESCRIPTION OF THE DRAWINGS

Further, characteristic features and advantages of the present invention will become evident from the following description made with reference to the attached drawings in which:

Referring now to FIG. 1, monitoring station 1 and the monitored station 2 are connected by two coaxial lines 3 and 4 along which are disposed at regular intervals two-way repeaters-regenerators; while two two-way repeaters-regenerators P and P+1 are illustrated in FIG. 1. It is to be understood that any appropriate number of repeaters-regenerators can be employed in the system.

The monitoring station 1 sends through coaxial line 3 analog or digital data signals, a low frequency signal $LF_1$ and a power supply current. The monitoring station 1 receives through coaxial line 4 the low frequency current $LF_1$ modulated by supervisory signals from repeaters-regenerators P and P+1 and the return power supply current. Each of repeater-regenerators P and P+1 is fed at two points by the remote supply current, from forward coaxial line 3 and from backward coaxial line 4.

Figure 1:
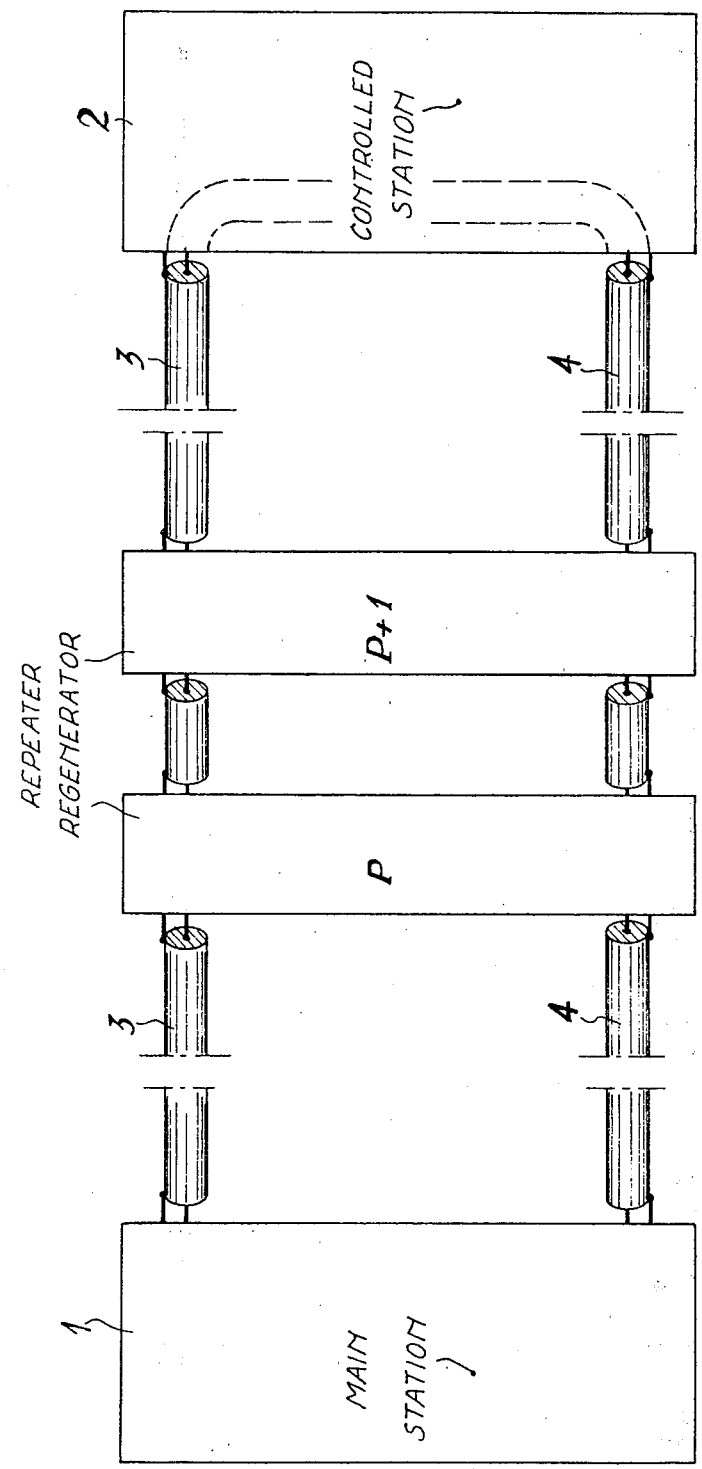
FIG. 1 is a block diagram of a coaxial cable link equipped with repeaters-regenerators in accordance with the invention.
Figure 2:
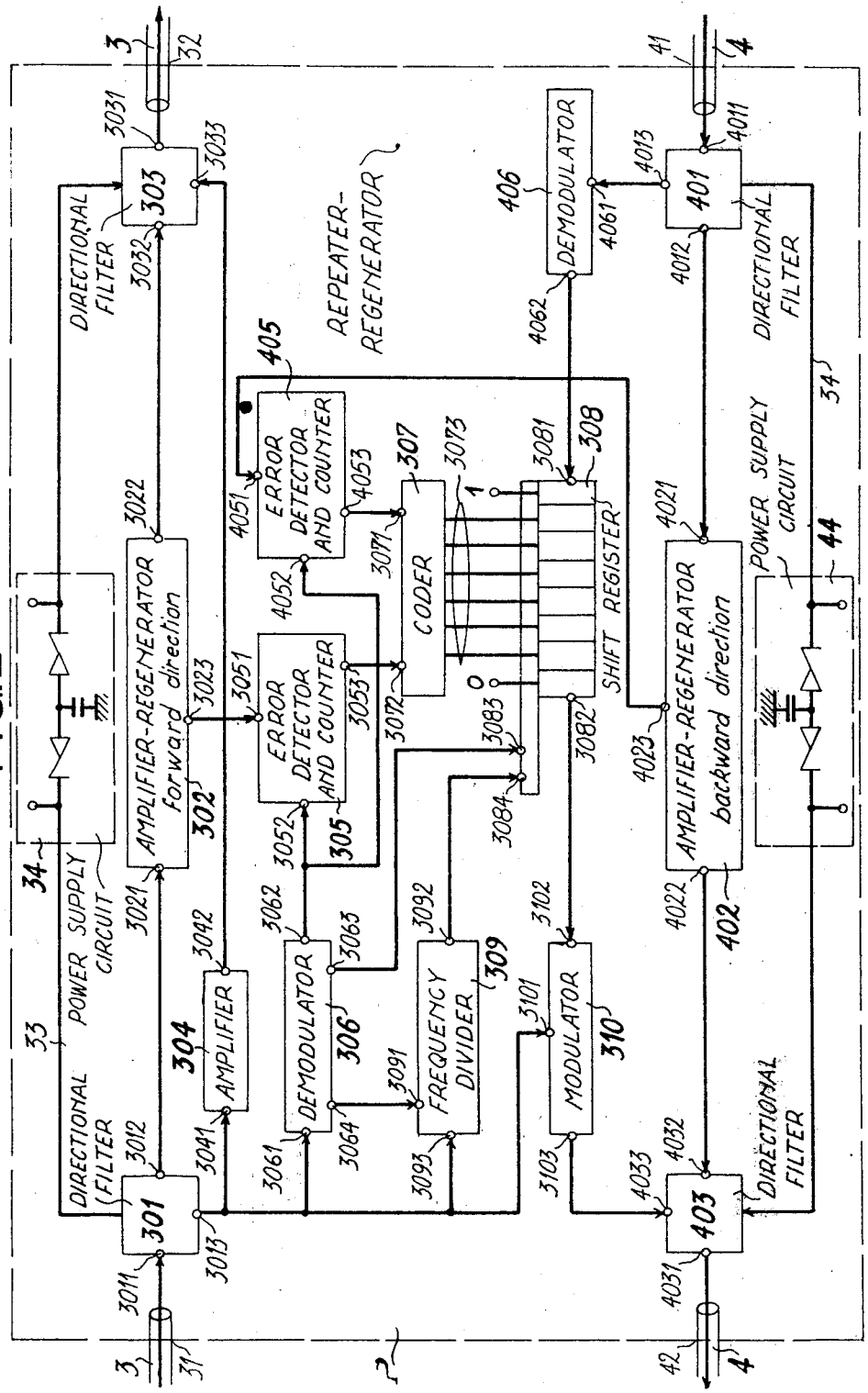
FIG. 2 is a block diagram of the internal arrangement of a repeater-regenerator in a remote monitoring system in accordance with the invention.

In the circuit of FIG. 2, a block diagram of remote monitored repeater-regenerator P, incoming coaxial line 3 enters the repeater-regenerator P at terminal 31 and outgoing coaxial line 3 leaves this repeater-regenerator at terminal 32 similarly. Incoming coaxial line 4 enters the repeater-regenerator P at terminal 41 and outgoing coaxial line 4 leaves this repeater-regenerator at terminal 42.

Input terminals 31 and 41 are respectively connected to input terminals 3011 and 4011 of incoming directional filter 301 and 401 which separate the data, the control signal and the D.C. supply current. The data appears on output terminals 3012 and 4012 of incoming directional filters 301 and 401 respectively from which they are respectively applied to the amplifiers-regenerators 302 and 402, and then to the outgoing directional filters, 303 and 403 respectively.

More precisely, outputs 3012 and 4012 of the incoming directional filters 301 and 401 are respectively connected to the inputs 3021 and 4021 of amplifiers-regenerators 302 and 402; the outputs 3022 and 4022 of said amplifiers-regenerators 302 and 420 are connected to the inputs 3032 and 4032 of the outgoing directional filters 303 and 403 and the outputs 3031 and 4031 of said outgoing directional filters are connected to terminals 32 and 42 of the two-way repeater-regenerator P.

The control signal appears at output terminal 3013 of incoming directional filter 301 which is connected to input terminal 3041 of a control signal amplifier 304. The resulting amplified control signal derived on output terminal 3042 of amplifier 304 is applied to input terminal 3033 of outgoing directional filter 303. Therefore, there is an amplifying channel 301-302-303 and 401-402-403 for the data signals in the forward and backward directions and a particular amplifying channel 301-304-303 for the control signal in the forward direction only. Further, a direct current channel respectively 33 and 43, is provided between the directional filters 301 and 303 and 401 and 403. Channels 33 and 43 respectively include power supply circuits 34 and 44.

The repeaters-regenerators 302 and 402 include outputs 3023 and 4023 respectively connected to the inputs 3051 and 4051 of two error detectors and counters 305 and 405. The error detectors and counters 3051 and 4051 include outputs 3053 and 4053 connected to the inputs 3071 and 3072 of a coder 307. Finally, the outputs 3073 of the coder 307 are connected to the corresponding inputs of a shift register 308.

Output terminal 3013 of directional filter 301 is connected to the input 3061 of demodulator 306 and the input 3101 of modulator 310. To control the transfer of the data from error detector and counters 305 and 405 to coder 307 and the clearing of these error detectors and counters. Demodulator 306 includes output terminal 3062, connected to input terminals 3052 or 4052 of detector counter circuits 305 and 405. Demodulator 306 also controls, through terminals 3063 and 3083, the transfer of the error data from coder 307 to shift register 308. Shift register 308 is loaded with the error data, at the same time the most significant (last stage) and least significant (first stage) bit stages thereof are respectively loaded with binary one and zero bit values. The error data forms an arythmic i.e., non-synchronous start-stop word. Demodulator 306 demodulates relatively long signal pulses. In response to the leading edge of the demodulated pulses, demodulator 306 generates three successive control pulses. The first control pulse causes transfer of the supervisory word from error detectors and counters 305 and 405 to coder 307 and clearing of the error detectors and the first pulse is coupled from terminal 3062 to terminals 3052 and 4052. The second control pulse causes loading of the supervisory signal shift register 308. The second pulse is coupled from terminal 3063 to terminal 3083. The third control pulse synchronizes frequency divider 309 it is coupled from terminal 3064 to terminal input terminals 3093 and 3091 of frequency divider 309 are responsive to the low frequency signal $LF_1$ and synchronizing pulses from demodulator 306. divider 309 generates, on terminal 3092 advance pulses for shift register 308; the advance pulses are applied to shift register 308 via terminal 3084.

Coder 307 may be of any known type. Two examples of supervisory codes are:

| 1 - Errors detected and counted per measuring period | Code |
|---|---|
| No error | 000 |
| 1 error | 001 |
| 2 to $2^3$ − 1 errors | 010 |
| $2^3$ to $2^5$ − 1 errors | 011 |
| $2^5$ to $2^7$ − 1 errors | 100 |
| $2^7$ to $2^9$ − 1 errors | 101 |
| $\geq 2^9$ errors | 110 |
| Total lack of signal | 111 |

For this example, coder 307 has eight bit positions: 2×3 bit code positions, 1 start bit position, 1 stop bit position.

| 2 - Errors detected and counted per measuring period | Code |
|---|---|
| Unused | 0000 |
| No error | 0001 |
| 1 error | 0010 |
| 2 to $2^2$ − 1 errors | 0011 |
| $2^2$ to $2^3$ − 1 errors | 0100 |
| $2^3$ to $2^4$ − 1 errors | 0101 |
| $2^4$ to $2^5$ − 1 errors | 0110 |
| $2^5$ to $2^6$ − 1 errors | 0111 |
| $2^6$ to $2^7$ − 1 errors | 1000 |
| $2^7$ to $2^8$ − 1 errors | 1001 |
| $2^8$ to $2^9$ − 1 errors | 1010 |
| $2^9$ to $2^{10}$ − 1 errors | 1011 |
| $2^{10}$ to $2^{11}$ − 1 errors | 1100 |
| $\geq 2^{11}$ errors | 1101 |
| Total lack of signal unused | 1111 |

For this example, coder 307 has ten bit positions: 2×4 bit code positions, 1 start bit position, 1 stop bit position.

The control signal $LF_1$ is applied to input terminal 3101 of modulator 310, also having input terminal 3102 responsive to a supervisory bit pattern from supervisory register 308. Output terminal 3103 of modulator 310 supplies the control signal modulated by the supervisory bit pattern and applies to input terminal 4033 of directional filter 403.

The low frequency of the control signal $LF_1$ may be 4 kHz and the division factor of frequency divider 309 may be 32, in which case the bit rate is 125 bits per second. It is to be understood these are merely exemplary values for the frequency of signal LF, and the division factor.

Thus, control signal $LF_1$ is coupled through the repeater-regenerator in the forward direction via a bypass path or back loop wherein it is the repeater-regenerator also loops the incoming signal on coaxial line 3 to outgoing coaxial line 4 along a loop path including a modulator in series and a demodulator in parallel. The demodulator 306 associated with frequency divider 309 controls the error detector and counter and the word shift register and the bit pattern contained therein is modulated in the modulator and sent to the monitoring station.

The modulated start-stop words, while propagating towards the monitoring station 1, are coupled through other repeaters-regenerators in the backward direction. In these repeaters-regenerators, the data and the modulated low frequency signal are separated in directional filter 401. Then the backward low frequency signal modulated by the supervisory start-stop words is applied through terminals 4013, 4061 to a demodulator 406. Finally, the supervisory start-stop words from the other repeater-regenerators are applied shift register 308 via terminals 4062, 3081. From shift register 308, the start-stop words derived from the other repeaters-regenerators are handled in the same way as the start stop word derived from the given repeater-regenerator.

Figure 3:
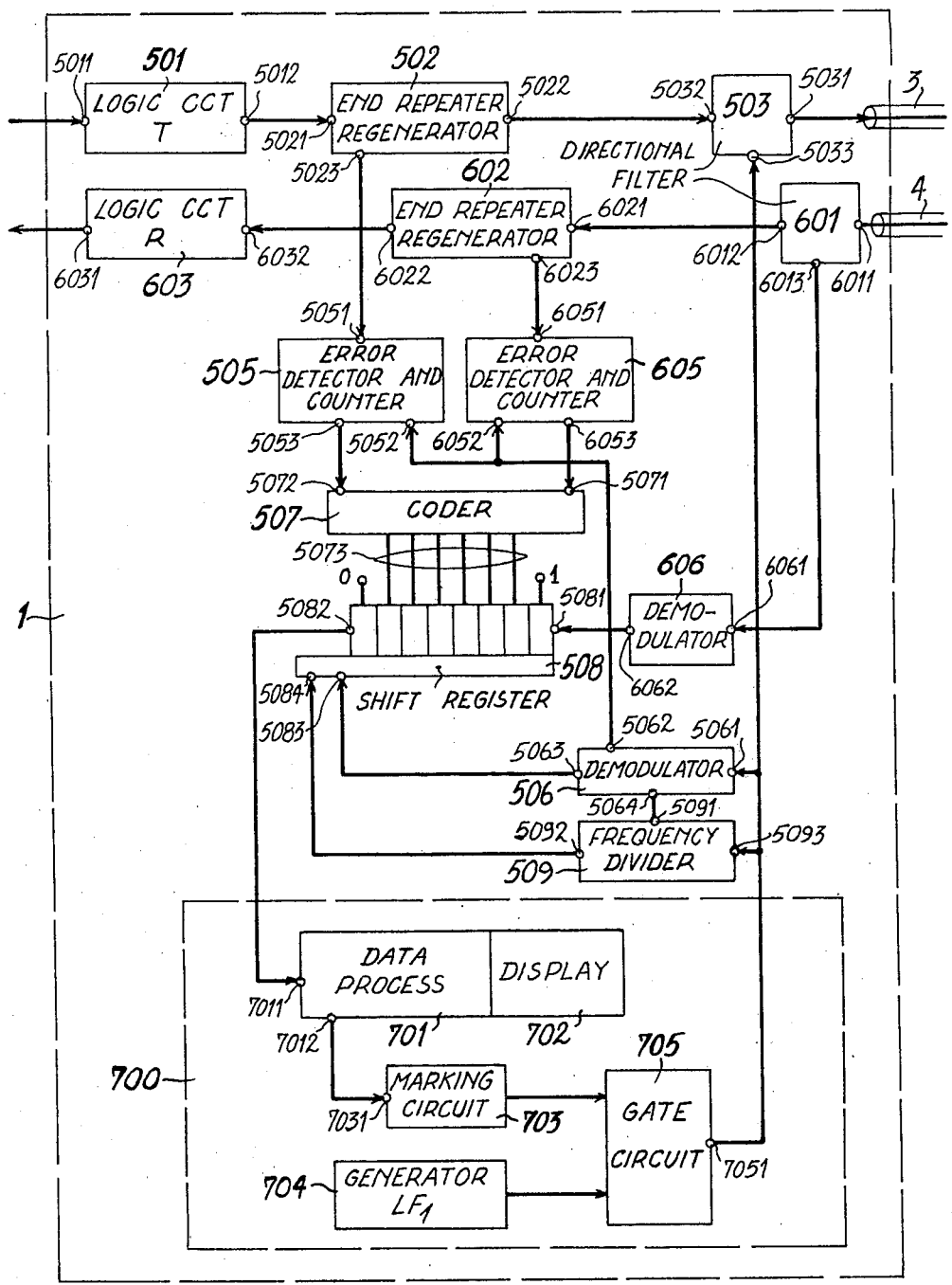
FIG. 3 is a block diagram of the internal arrangement of the telemonitoring station in a telemonitoring system in accordance with the invention.

FIG. 3 is a block diagram of monitoring station 1, which comprises an end forward amplifier-regenerator 502 identical to amplifier-regenerator 302 and and end backward amplifier-regenerator 602 identical to amplifier-regenerator 402.

Error detectors and counters 505 and 605, coder 507, shift register 508, demodulator 506, frequency divider 509 and demodulator 606, have functions similar to error detectors and counters 305 and 405, coder 307, shift register 308, demodulator 306, frequency divider 309 and demodulator 406 respectively. The circuits and terminals having the same functions in FIGS. 2 and 3, have reference numerals differing by 200 from one another. Since the circuit having corresponding reference numerals in FIGS. 2 and 3 have identical functions, they are not described again.

A transmit logic circuit 501 such as a data terminal including a modem, is connected to forward amplifier-regenerator 502 via terminals 5012 and 5021 and a receive logic circuit 603, such as a data receiver including a modem, is connected to backward amplifier-regenerator 602.

The monitoring station also comprises a data process stage 700 including a data processing circuit 701 and a display circuit 702. Data procesing circuit 701 comprises a demodulator which demodulates the bit pattern derived from supervisory shift register 508 and decodes the supervisory words using a decoder similar to those used in start-stop teleprinters. The words are decoder in the form of characters which are displayed on display circuit 702. Data processing circuit 701 also comprises means for generating a triggering pulse after a delay following reception of the supervisory word derived from the most remote repeater-regenerator, i.e. the repeater-regenerator included in the monitored station 2. The triggering pulse defines the beginning of a new error acquiring cycle for acquiring other errors from all the repeaters-regenerators of the telecommunication link in response to the next control pulse modulating the low frequency signal on the forward line. This triggering pulse activates a marking circuit 703 such as a monostable flip-flop, via terminals 7012 and 7013. Marking circuit 703 delivers a control pulse, the leading edge of which is detected successively in the demodulators 306 (or 506) of the repeaters-regenerators to control the transfer of supervisory information on the backward line. An analog gate circuit 705 receives the control pulse from the marking circuit and the low frequency signal $LF_1$ from a generator 704 to derive the low frequency signal modulated by the control pulse.

The modulated low frequency signal $LF_1$ derived by gate circuit 705 is applied to input 5033 of directional filter 503, input 5061 of demodulator 506 and input 509 of frequency divider 509.

It is clear from the previous description that the supervisory words are sent from each repeater-regenerator through the return transmission link in the form of start stop telegraph words and the local signals necessary for controlling the detection, the counting and the sending of the supervisory information are all derived from the low frequency control signal $LF_1$.

What we claim is:

1. Monitoring system for monitoring a performance factor of two-way repeaters-regenerators of a telecommunication link between a monitoring station and a monitored station, an exemplary performance factor being errors in the repeaters-regenerators, said telecommunication link including a forward link for transmission of data signals in a first direction between the stations and a backward link for transmission of data signals in a second direction between the stations, said monitoring station comprising:

sending means for sending information data and a low frequency signal modulated by control pulses through said forward link, and receiving means for receiving information data from said monitored station and supervisory words indicative of the performance of said repeaters-regenerators, said supervisory words modulating the low frequency signal looped back in said repeaters-regenerators through said backward link;

each of said repeaters-regenerators comprising:

frequency separating means connected to said forward link for separating said control pulses modulating said low frequency signal from said forward information data, means for detecting said performance of said repeater-regenerator with regard to errors made in an in-line code of said forward and backward information data during each modulating control pulse, means for detecting the leading edge of said modulating control pulses, means controlled by said control pulse detecting means for deriving a bit pattern from said detected performances after each detected control pulse, a shift register storing said derived bit pattern and a start bit and a stop bit as a supervisory word coupled to said shift register, frequency dividing means responsive to said modulating control pulses and synchronized by said control pulse detecting means for generating advance pulses of said shift register having a frequency that is a submultiple of said low frequency signal;

means receiving said moulated control pulses for modulating said low frequency signal by the bits of said supervisory word derived from said shift register at said submultiple frequency, and means connected to said backward link for combining said supervisory word modulating said low frequency signal with said backward information data.

2. The monitoring system of claim 1 wherein each repeater-regenerator comprises frequency separating means connected to said backward link for separating said supervisory words modulating said low frequency signal and derived from the other repeaters-regenerators on said backward link in response to a same detected control pulse derived from said backward information data, and means for demodulating said low frequency signal modulated by said supervisory words derived from said other repeaters-regenerators into demodulated supervisory words to be applied to said shift register.

3. A repeater-regenerator for enabling monitoring of a performance factor of a transmission link including: a monitoring station, a monitored station, plural repeaters-regenerators, a forward link for transmitting signals from the monitoring station to the monitored station via the repeaters-regenerators, and a backward link for transmitting signals from the monitored station to the monitoring station via the repeaters-regenerators, an exemplary performance factor being errors in the transmitted signals susceptible of detection in the repeaters-regenerators, the monitoring station transmitting information data and low frequency signals through said forward link toward the monitored station, the transmitted low frequency signal being modulated with control pulses, the monitored station responding to the signal of the forward link and transmitting the low frequency modulated signal and an information signal toward the monitoring station via the backward link, each repeater-regenerator comprising a first channel responsive to and amplifying the information data signal transmitted in the forward link toward the monitored station, a second channel responsive to the low frequency, modulated signal transmitted toward the monitored station in the forward link, a third channel responsive to and amplifying the information data signal transmitted in the backward link toward the monitoring station, a fourth channel responsive to the low frequency modulated signal transmitted in the backward link toward the monitoring station, said second channel including: means for demodulating the transmitted low frequency modulated signal in the second channel to derive first, second and third control pulses in response to a control pulse derived at the monitoring station, means activated by the first control pulse to be responsive to the signal in the first and third channels for deriving a multi-bit binary signal having a value indicative of the performance factor of the forward and backward links, a multistage shift register for storing a supervisory word having multiple intermediate bits as well as first and last binary bits having values associated with stop and start values and activated by a second control pulse replica so intermediate stages thereof are loaded in response to the multi-bit performance factor indicating binary signal and first and last stages thereof are respectively loaded with binary bit values associated with start and stop values for a multi-bit binary word, means activated by the third control pulse to be responsive to the transmitted low frequency signal for deriving a shift signal having transitions synchronized with and at lower frequency than the frequency of the transmitted low frequency signal, the shift signal being applied to a shift input of the shift register so that the shift register derives a sequence of pulses having binary levels indicative of the binary bit values loaded into the first, intermediate and last stages of the shift register, modulator means responsive to the transmitted low frequency signal in the second channel and the sequence of pulses for deriving another modulated signal wherein the low frequency is modulated by the sequence of pulses; means for coupling the amplified information signal in the first channel and the low frequency modulated signal in the second channel to the forward link toward the monitored station; the fourth channel including means for demodulating the low frequency signal transmitted in the backward link toward the monitoring station to derive a replica of the supervisory words and performance factor indicating words derived from other repeaters-regenerators which transmit toward said one repeater-generator via the backward loop, the replica of the supervisory words and performance indicating words derived from other repeater-regenerators being applied to the last stage of the shift register to be shifted through the shift register in response to the shift signal, whereby the shift register supplies the bits in the supervisory words and performance indicating words derived from other repeater-regenerators in sequence to the modulator which responds to the said bits in deriving the another modulated signal and means for coupling the amplified information signal in the third channel and the another modulated signal to the backward link toward the monitoring station.

4. A repeater-regenerator in a transmission link including: a monitoring station, a monitored station, N of the repeater-regenerator circuits, where N is an integer greater than one, a forward link for transmitting signals from the monitoring station to the monitored station via the N repeater-regenerator circuits, and a backward link for transmitting signals from the monitored station to the monitoring station via the N repeaters-regenerator circuits, an exemplary performance factor being errors in the transmitted signals susceptible of detection in the repeater-regenerator circuits, the monitoring station transmitting information data and low frequency signals through said forward link toward the monitored station, the transmitted low frequency signal being modulated with control pulses, the monitored station responding to the signal of the forward link and transmitting the low frequency modulated signal and another information signal toward the monitoring station via the backward link, repeater-regenerator k comprising means for amplifying the information data signal transmitted in the forward link toward the monitored station, means for demodulating the transmitted low frequency modulated signal to derive a control signal, means activated by the control signal to be responsive to the information signal transmitted via the forward link for deriving a multi-bit supervisory binary signal word having start and stop bits and intermediate bits with values indicative of the performance factors of the forward link, a multistage shift register activated by the control signal so intermediate stages thereof are loaded in response to the multi-bit supervisory binary signal word and first and last stages thereof are respectively loaded with binary bit values associated with start and stop values for the multi-bit supervisory binary word, means activated by the control signal to be responsive to the transmitted low frequency signal for deriving a shift signal having transitions synchronized with and at lower frequency than the frequency of the transmitted low frequency signal, the shift signal being applied to a shift input of the shift register so that the shift register derives a sequence of pulses having binary levels indicative of the binary bit values loaded into the first, intermediate and last stages of the shift register, modulator means responsive to the transmitted low frequency signal in the forward link and the sequence of pulses for deriving another modulated signal wherein the low frequency is modulated by the sequence of pulses, and means for coupling the amplified information signal in the forward link and the low frequency signal in the forward link toward the monitored station; means for amplifying the information data signal transmitted in the backward link toward the monitoring station, means responsive to the low frequency modulated signal transmitted in the backward link toward the monitoring station for demodulating the low frequency signal transmitted in the backward link toward the monitoring station to derive a replica of multi-bit supervisory signals derived from shift registers at repeater-regenerator circuits (k+1), (k+2)-(N−1), N, the replica of the signals derived from the registers at circuits of circuits (k+1), (k+2)-(N−1), N being applied to the last stage of the shift register of circuit k to be shifted through the shift register in response to the shift signal whereby the shift register supplies the bits in the supervisory words derived from the circuits k, (k+1), (k+2)-(N−1), N in the stated sequence to the modulator, and means for coupling the amplified information signal in the backward link and the another modulated signal toward the monitoring station.

5. Apparatus for monitoring a performance factor of a transmission link including: a monitoring station, a monitored station, N repeater-regenerator circuits, where N is an integer greater than one, a forward link for transmitting signals from the monitoring station to the monitored station via the N repeater-regenerator circuits, and a backward link for transmitting signals from the monitored station to the monitoring station via the N repeater-regenerator circuits, an exemplary performance factor being errors in the transmitted signals susceptible of detection in the repeater-regenerator circuits, the monitoring station comprising: means for transmitting information data and low frequency signals through said forward link toward the monitored station, means for modulating the transmitted low frequency signal with control pulses; the k repeater-regenerator circuit including (where k is selectively every integer from 1 to N): means for amplifying the information data signal transmitted in the forward link toward the monitored station, means for demodulating the transmitted low frequency modulated signal to derive a control signal, means activated by the control signal to be responsive to the information signal transmitted via the forward link for deriving a multi-bit supervisory binary signal word having start and stop bits and intermediate bits with values indicative of the performance factor of the forward link, a multistage shift register activated by the control signal so intermediate stages thereof are loaded in response to the multi-bit supervisory binary signal word and first and last stages thereof are respectively loaded with binary bit values associated with start and stop values for the multi-bit supervisory binary word, means activated by the control signal to be responsive to the transmited low frequency signal for deriving a shift signal having transitions synchronized with and at lower frequency than the frequency of the transmitted low frequency signal, the shift signal being applied to a shift input of the shift register so that the shift register derives a sequence of pulses having binary levels indicative of the binary bit values loaded into the first, intermediate and last stages of the shift register, modulator means responsive to the transmitted low frequency signal in the forward link and the sequence of pulses for deriving another modulated signal wherein the low frequency is modulated by the sequence of pulses and means for coupling the amplified information signal in the forward link and the low frequency signal in the forward link toward the monitored station; the monitored station comprising: means responsive to the signal of the forward link, and means for transmitting the low frequency modulated signal and another information signal toward the monitoring station via the backward link; the k repeater-regenerator circuit further including: means for amplifying the information data signal transmitted in the backward link toward the monitoring station, means responsive to the low frequency modulated signal transmitted in the backward link toward the monitoring station for demodulating the low frequency signal transmitted in the backward link toward the monitoring station to derive a replica of multi-bit supervisory signals derived from shift registers at repeater-regenerator circuits (k+1), (k+2)-(N−1), N, the replica of the signals derived from the registers at circuits (k+1), (k+2)-(N−1), N being applied to the last stage of the shift register of circuit k to be shifted through the shift register in response to the shift signal whereby the shift register supplies the bits in the supervisory words derived from the circuits k, (k+1), (k+2)-(N−1), N in the stated sequence to the demodulator, and means for coupling the amplified information signal in the backward link and the another modulated signal toward the monitoring station; the monitoring station further comprising: means responsive to the information signal transmitted toward it via the backward link, and means responsive to the modulated signal transmitted toward it via the backward link for detecting the performance factor indicating bits of the particular and other circuits.

6. Apparatus for monitoring a performance factor of a transmission link including: a monitoring station, a monitored station, plural repeater-regenerator circuits, a forward link for transmitting signals from the monitoring station to the monitored station via the repeater-regenerator circuits, and a backward link for transmitting signals from the monitored station to the monitoring station via the repeater-regenerator circuits, an exemplary performance factor being errors in the transmitted signals susceptible of detection in the repeater-regenerator circuits, the monitoring station comprising: means for transmitting information data and low frequency signals through said forward link toward the monitored station, means for modulating the transmitted low frequency signal with control pulses; each repeater-regenerator circuit including: a first channel responsive to and amplifying the information data signal transmitted in the forward link toward the monitored station, a second channel responsive to the transmitted low frequency, modulated signal; said second channel including: means for demodulating the transmitted low frequency modulated signal in the second channel to derive first, second and third control pulses in response to each control pulse derived at the monitoring station, means activated by the first control pulse to be responsive to the signal in the first channel for deriving a multi-bit supervisory binary signal word having start and stop bits and intermediate bits with values indicative of the performance factor of the forward link, a multistage shift register activated by the second control pulse so intermediate stages thereof are loaded in response to the multi-bit supervisory binary signal word and first and last stages thereof are respectively loaded with binary bit values associated with start and stop values for the multi-bit supervisory binary word, means activated by the third control pulse to be responsive to the transmitted low frequency signal for deriving a shift signal having transitions synchronized with and at lower frequency than the frequency of the transmitted low frequency signal, the shift signal being applied to a shift input of the shift register so that the shift register derives a sequence of pulses having binary levels indicative of the binary bit values loaded into the first, intermediate and last stages of the shift register, modulator means responsive to the transmitted low frequency signal in the second channel and the sequence of pulses for deriving another modulated signal wherein the low frequency is modulated by the sequence of pulses; each repeater-regenerator circuit coupling the amplified information signal in the first channel and the low frequency signal in the second channel to the forward link toward the monitored station; the monitored station responding to the signal of the forward link and transmitting the low frequency modulated signal and another information signal toward the monitoring station via the backward link; each repeater-regenerator circuit further including: a third channel responsive to and amplifying the information data signal transmitted in the backward link toward the monitoring station, a fourth channel responsive to the low frequency modulated signal transmitted in the backward link toward the monitoring station, the fourth channel including means for demodulating the low frequency signal transmitted in the backward link toward the monitoring station to derive a replica of multi-bit supervisory signals derived from shift registers at the repeater-regenerator circuits in the backward link between the particular repeater-regenerator circuit and the monitored station, the replica of the signals derived from the registers at the other circuits being applied to the last stage of the shift register to be shifted through the shift register in response to the shift signal whereby the shift register supplies the bits in the supervisory words derived from the particular circuit and the other circuit in sequence to the modulator, the repeater-regenerator circuit including means for coupling the amplified information signal in the third channel and the another modulated signal to the backward link toward the monitoring station; the monitoring station further including: means responsive to the information signal transmitted toward it via the backward link, and means responsive to the modulated signal transmitted toward it via the backward link for detecting the performance factor indicating bits of the particular and other circuits.

7. A repeater-regenerator in a transmission link including: a monitoring station, a monitored station, N of the repeater-regenerator circuits where N is an integer greater than one, a forward link for transmitting signals from the monitoring station to the monitored station via the N repeaters-regenerator circuits, and a backward link for transmitting signals from the monitored station to the monitoring station via the N repeaters-regenerator circuits, an exemplary performance factor being errors in the transmitted signals susceptible of detection in the repeater-regenerator circuits, the monitoring station transmitting information data and low frequency signals through said forward link toward the monitored station, the transmitted low frequency signal being modulated with control pulses; the monitored station responding to the signals of the forward link and transmitting the low frequency modulated signal and another information signal toward the monitoring station via the backward link; repeater-regenerator k comprising means for handling the information signals transmitted via the forward and backward links, means for coupling the handled information signal transmitted via the forward link and the low frequency signal transmitted via the forward link to repeater-regenerator (k+1), means responsive to at least one of the handled information signals for deriving a multi-bit supervisory word signal having start and stop bits and intermediate bits with values indicative of the performance factor of at least one of the links as detected at repeater-regenerator k, a multistage shift register having intermediate stages responsive to the intermediate bits and first and last stages responsive to predetermined bit values for start and stop bits, means responsive to the low frequency signal for shifting the contents of the shift register so there is derived from the shift register last stage a sequence of pulses, means for modulating the sequence of pulses to derive another low frequency information signal, means for coupling the handled information signal transmitted via the backward link and the another low frequency information signal to repeater-regenerator (k−1), means for coupling the another low frequency information signal from repeater-regenerators (k+1), (k+2)-(N−1), N to the first stage of the shift register so the start and stop bits and intermediate bits of supervisory signals from repeater-regenerators k, (k+1), (k+2)-(N+1), N are derived from the shift register last stage and coupled to repeater-regenerators (k−1), (k−2)-1.

* * * * *